US012356463B2

(12) United States Patent
Sun et al.

(10) Patent No.: US 12,356,463 B2
(45) Date of Patent: Jul. 8, 2025

(54) MULTIPLE ACCESS POINT UPLINK ORTHOGONAL FREQUENCY-DIVISION MULTIPLE ACCESS BASED RANDOM ACCESS

(71) Applicants: SONY GROUP CORPORATION, Tokyo (JP); SONY CORPORATION OF AMERICA, New York, NY (US)

(72) Inventors: Li-Hsiang Sun, San Jose, CA (US); Mohamed Abouelseoud, Burlingame, CA (US); Liangxiao Xin, Santa Clara, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 468 days.

(21) Appl. No.: 17/936,725

(22) Filed: Sep. 29, 2022

(65) Prior Publication Data
US 2023/0122711 A1 Apr. 20, 2023

Related U.S. Application Data

(60) Provisional application No. 63/262,786, filed on Oct. 20, 2021.

(51) Int. Cl.
*H04W 74/08* (2024.01)
*H04W 74/0833* (2024.01)
(52) U.S. Cl.
CPC .............................. *H04W 74/0833* (2013.01)
(58) Field of Classification Search
CPC ......... H04W 74/0833; H04W 74/0808; H04W 74/002; H04W 72/20; H04W 84/12;
(Continued)

(56) References Cited

U.S. PATENT DOCUMENTS

2014/0119300 A1* 5/2014 Aboul-Magd ....... H04J 11/0053
370/329
2016/0234831 A1* 8/2016 Tian .................... H04W 72/121
(Continued)

FOREIGN PATENT DOCUMENTS

EP 2401887 A1 1/2012
WO 2010099496 A1 9/2010
(Continued)

OTHER PUBLICATIONS

Lopez-Perez, David et al., "IEEE 802.11be Extremely High Throughput: The Next Generation of Wi-Fi Technology Beyond 802.11ax", https://ieeexplore.ieee.org/document, Sep. 27, 2019, pp. 1-6.
(Continued)

*Primary Examiner* — Candal Elpenord
(74) *Attorney, Agent, or Firm* — O'BANION & RITCHEY LLP; John P. O'Banion

(57) ABSTRACT

Method and apparatus for supporting simultaneous MultiUser (MU) Multiple-Input Multiple-Output (MIMO) operations utilizing Orthogonal Frequency Division Multiple Access (OFDMA) with Uplink OFDMA Random Access (UORA). Access Points (APs) trigger and obtain short PPDUs from the stations to learn spatial filtering patterns that are utilized in adjusting antenna phase differences to obtain minimum/maximum energy from this BSR. The APs determine favored and unfavored directions of communication, which are conveyed to non-AP UORA stations as channel estimation signals. The UORA stations base broadcasting on strengths of channel estimation signals to determine eligible UORA resource units. The UORA procedure to secondary APs allows a primary AP to trigger a UL-MU MIMO transmission with the number of spatial streams exceeding the number of antennas at the primary AP.

15 Claims, 13 Drawing Sheets

(58) Field of Classification Search
CPC ..... H04B 7/024; H04B 7/0452; H04L 5/0035; H04L 5/0044; H04L 5/0007; H04L 5/0023
USPC .................................................. 370/329–330
See application file for complete search history.

(56) References Cited

U.S. PATENT DOCUMENTS

| | | | | |
|---|---|---|---|---|
| 2019/0159220 A1* | 5/2019 | Elsherif | ................ | H04W 72/12 |
| 2020/0059808 A1* | 2/2020 | Lim | ...................... | H04W 72/04 |
| 2021/0385779 A1* | 12/2021 | Oteri | ...................... | H04B 7/024 |
| 2022/0217770 A1* | 7/2022 | Sun | ...................... | H04B 17/318 |
| 2023/0148282 A1* | 5/2023 | Marinier | ........... | H04W 72/0446 |
| | | | | 370/329 |
| 2024/0073952 A1* | 2/2024 | Kim | .................. | H04W 74/0816 |

FOREIGN PATENT DOCUMENTS

| | | |
|---|---|---|
| WO | WO-2020097487 A1 | 5/2020 |
| WO | WO-2021045396 A1 | 3/2021 |

OTHER PUBLICATIONS

Deng, Cailian et al., "IEEE 802.11be—Wi-Fi 7: New Challenges and Opportunities", arXiv: 2007.13401v3 [eess.SP], Aug. 3, 2020, pp. 1-30.

* cited by examiner

MULTIPLE ACCESS POINT UPLINK ORTHOGONAL FREQUENCY-DIVISION MULTIPLE ACCESS BASED RANDOM ACCESS

CROSS-REFERENCE TO RELATED APPLICATIONS

This application claims priority to, and the benefit of, U.S. provisional patent application Ser. No. 63/262,786 filed on Oct. 20, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication protocols under IEEE 802.11 using resource units (RUs) to support simultaneous Multi User (MU) operation using Orthogonal Frequency Division Multiple Access (OFDMA) and Uplink OFDMA Random Access (UORA), and more particularly to eliminating interference issues when performing UORA communications.

2. Background Discussion

IEEE 802.11be Extremely High Throughput (EHT) is the potential next amendment of the 802.11 IEEE standard, which build upon 802.11ax, focusing on WLAN indoor and outdoor operations. It is expected that UL-MU-MIMO use will be included in the upcoming 802.11be protocols.

In IEEE 802.11ax a regular channel is partitioned into smaller sub-channels called resource units (RUs) to support simultaneous MultiUser (MU) operation using Orthogonal Frequency Division Multiple Access (OFDMA). Uplink OFDMA Random Access (UORA) as performed in IEEE 802.11ax allows stations to transmit via a scheduled random access mechanism. UORA is a procedure triggered by the AP, with a trigger frame specifying many random RUs, and client transmits in a random RU using MCS and length specified by the trigger. UORA is initiated utilizing a Trigger Frame (TF) which aside from serving as a synchronization mechanism, also informs stations which RUs are allowed for random access. Using the trigger frame information, the stations engage in an OFDMA backoff process to obtain access to a resource unit.

Present UORA implementations rely on each AP in the multi-AP set having a number of receiving antennas equal to the total number of spatial streams transmitted by all UpLink (UL) users.

However, shortcomings of these UORA implementations can lead to interference between stations and thus collisions and loss of overall throughout.

Accordingly, a need exists for protocol enhancements which overcome interference issues. The present disclosure addresses the interference issue while providing additional benefits.

BRIEF SUMMARY

This invention relies on trigger based accesses and a coordinated UL-MU-MIMO procedure utilizing the trigger based access. The initial random access mechanism may be EDCA for sending the initial trigger frame to coordinate multiple APs. In the UL data transmission eventually triggered by the procedure, a UORA random access defined in 11 ax can also be utilized. This disclosure discusses data (random access or not) scheduled by an AP so CSMA/CA is not used by the non-AP stations. AP uses CSMA/CA to send an initial/first trigger frame, then after that all UL data transmissions are triggered (no CSMA/CA) with UORA being random in terms of RU location. For example, UORA STAs randomly choose a UORA RU to access, the start, end time and MCS of the UORA access are all determined by the AP.

A wireless apparatus. method, and 802.11 protocol are described which perform a coordinated Uplink (UL) Multi-User (MU) Multiple-Input Multiple-Output (MIMO) procedure which allows a primary AP and secondary APs to trigger a UL-MU MIMO transmission with the total number of spatial streams exceeding the total number of antennas at the primary AP.

A primary AP (e.g., AP1) may transmit a trigger frame to schedule a short UL transmission from an associated STA, thus allowing the primary AP and one or more secondary APs to estimate what spatial filters should be utilized. After the short UL transmission, the primary AP and one or more secondary APs may jointly transmit a joint Physical Layer Protocol Data Unit (PPDU) containing one or more trigger frames. The joint PPDU may contain channel estimation signals from the primary and the secondary APs. At least one channel estimation signal from each AP is beamformed towards a favored direction(s) of the AP. At least one channel estimation signal is beamformed towards the remaining directions (unfavored direction of the AP). The channel used to decode the data portion (i.e., trigger frame from each AP) of the joint PPDU may be estimated by combining the channel estimation of the channels in the favored direction(s) and the unfavored direction(s) of the AP.

A STA intending to perform UORA access in a given Basic Service Set (BSS) may determine each UORA Resource Unit (RU) assignment as eligible/ineligible based on one or more thresholds and comparing an output of a function of signal strengths of all, or subset of these channel estimation signals, against a threshold.

Thus, the sum of the number of spatial streams of scheduled UL transmission by the primary AP (e.g., AP1) and the number of UORA STAs in OBSS and the number of spatial streams of a scheduled transmission by the primary AP using the same time and frequency resource may exceed the number of receive antennas of AP1.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

1. Coordinated UL-MU-MIMO

Figure 1:
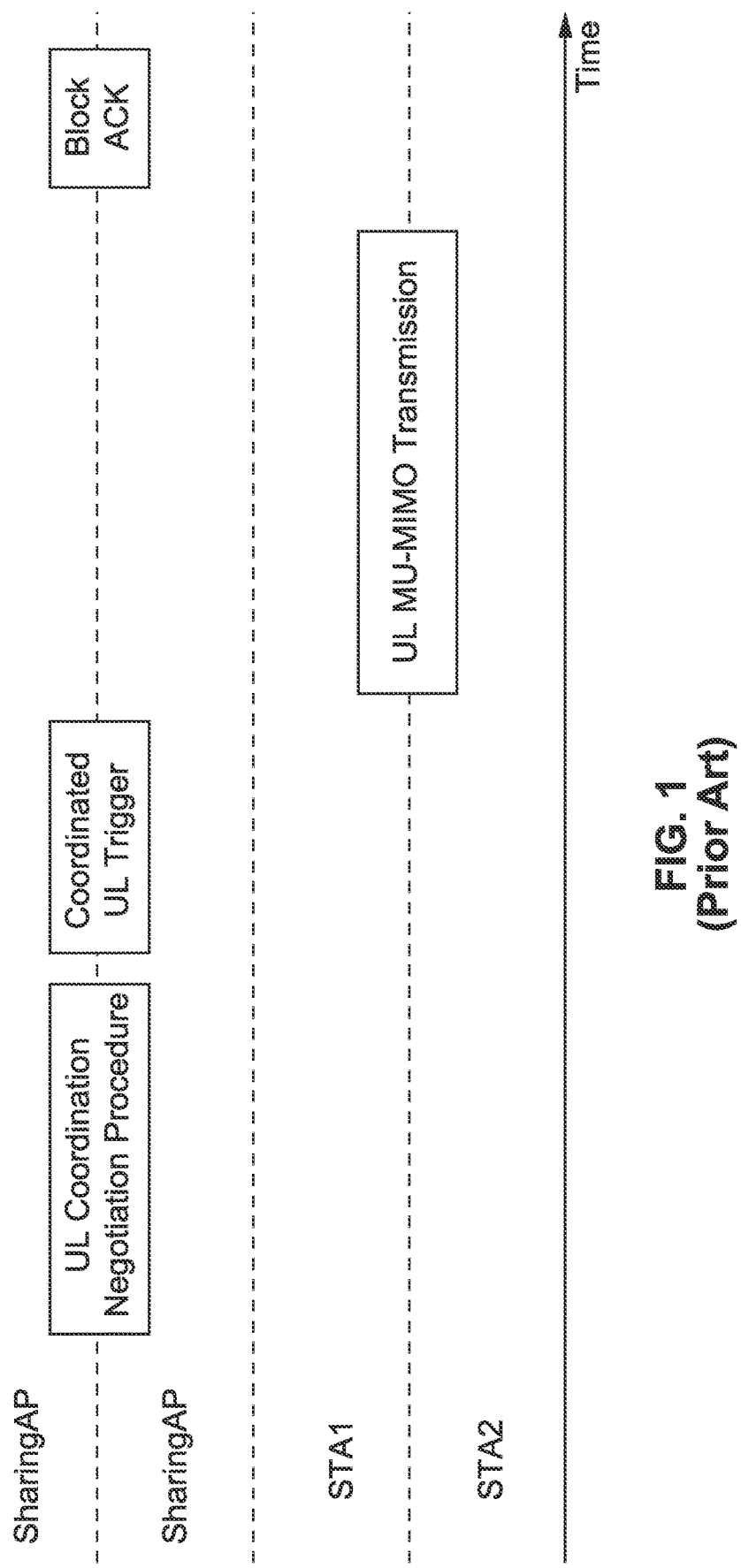
FIG. 1 is a communications diagram of a conditional Uplink Orthogonal frequency-division multiple access based Random Access (UORA) performing a coordinated Uplink (UL) Multiple-User (MU) Multiple-Input Multiple Output (MIMO) transmission.

A coordinated UL MU-MIMO has been agreed in a future release of WiFi. FIG. 1 illustrates coordinated UL-MU-MIMO. The dotted line between two stations indicates a joint transmission from the stations on both sides of the dotted line. Communications between two sharing APs, STA1 and STA2 are shown. Each of the APs has two antennas, and each of STA1 and STA2 transmit one spatial stream. Each AP must separate the transmission of the stream from STA1 and the stream of STA2, and this requires at least two antennas at each AP. In a coordinated UL MU-MIMO, each AP has the number of receiver (Nrx) greater than or equal to the number of interfering stations plus the number of received spatial streams (Nss).

1.1. Limitations of Coordinated UL-MU-MIMO

Figure 2:
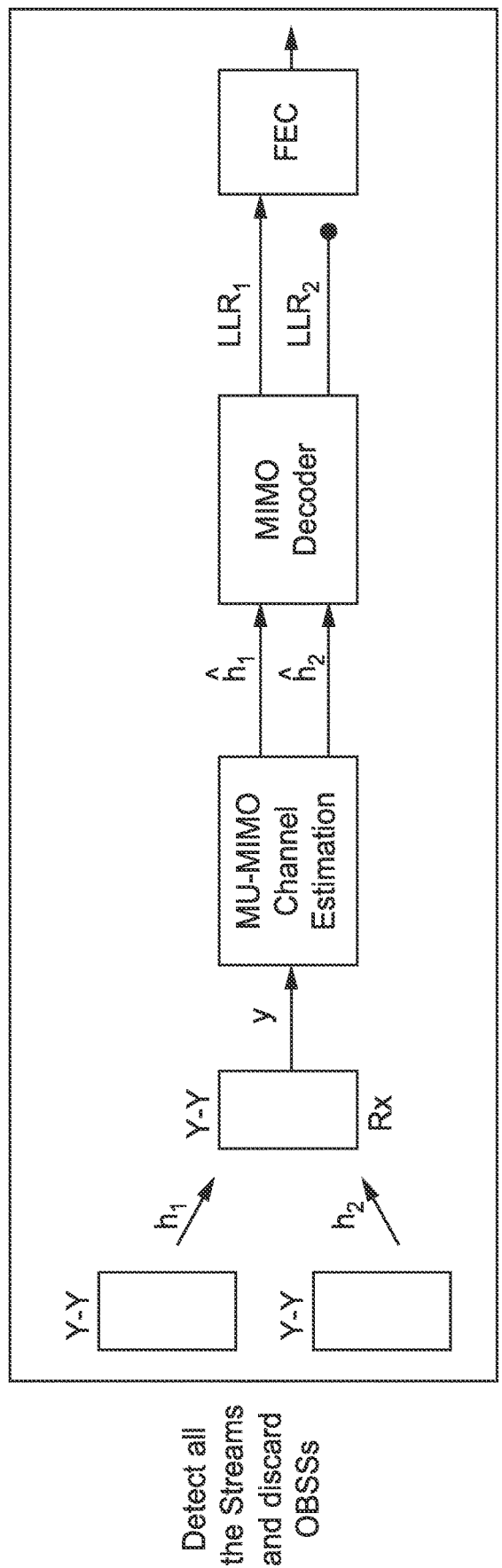
FIG. 2 is a block diagram of a wireless station detecting incoming streams and mitigating OBSS streams as interference.
Figure 3:
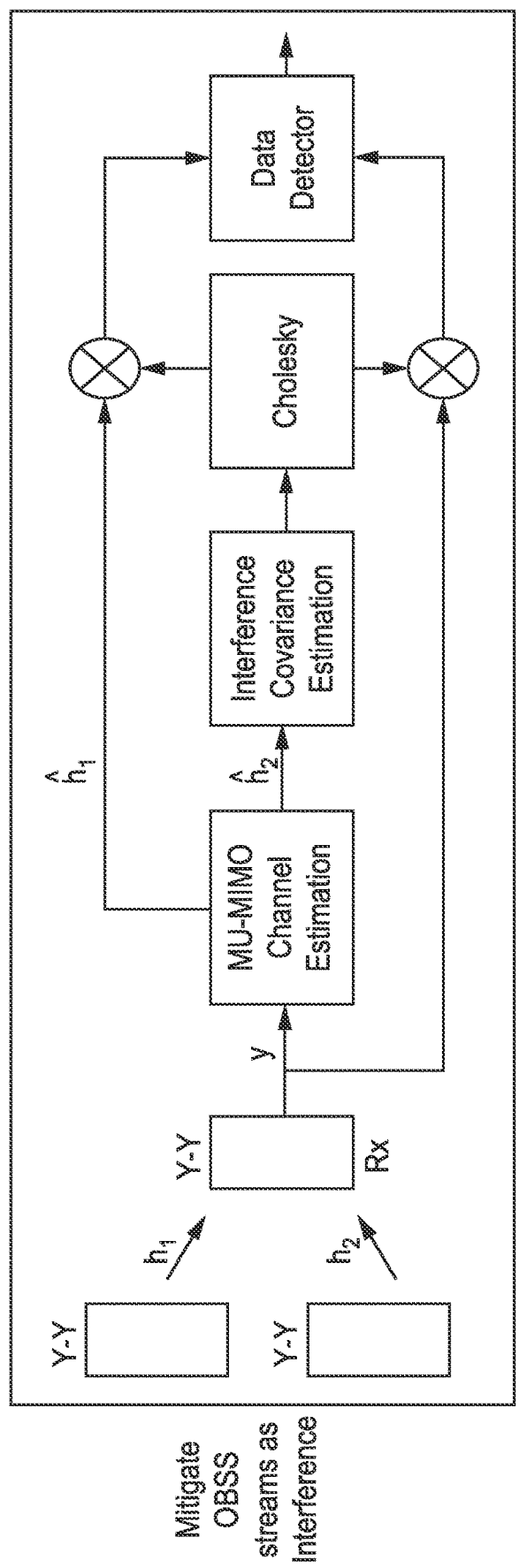
FIG. 3 is a block diagram of a wireless station detecting all incoming streams and discarding OBSSs.

FIG. 2 and FIG. 3 illustrate possible procedures at each AP receiver in a coordinated UL-MU-MIMO. Each AP is equipped to receive two streams and the stream from OBSS is discarded. In these two figures, "Y-Y" represents the antenna array at each station, h1 represents the channel from the intended transmitter to the AP receiver antenna array, and h2 represents the channel of OBSS interferer to the AP receiver antenna array. The blocks of receiver procedures at this figure are as if the AP receives two streams both intended for itself by detecting the values of two streams and throws away (ignores) the value of the stream actually not intended for the AP.

Figure 5:
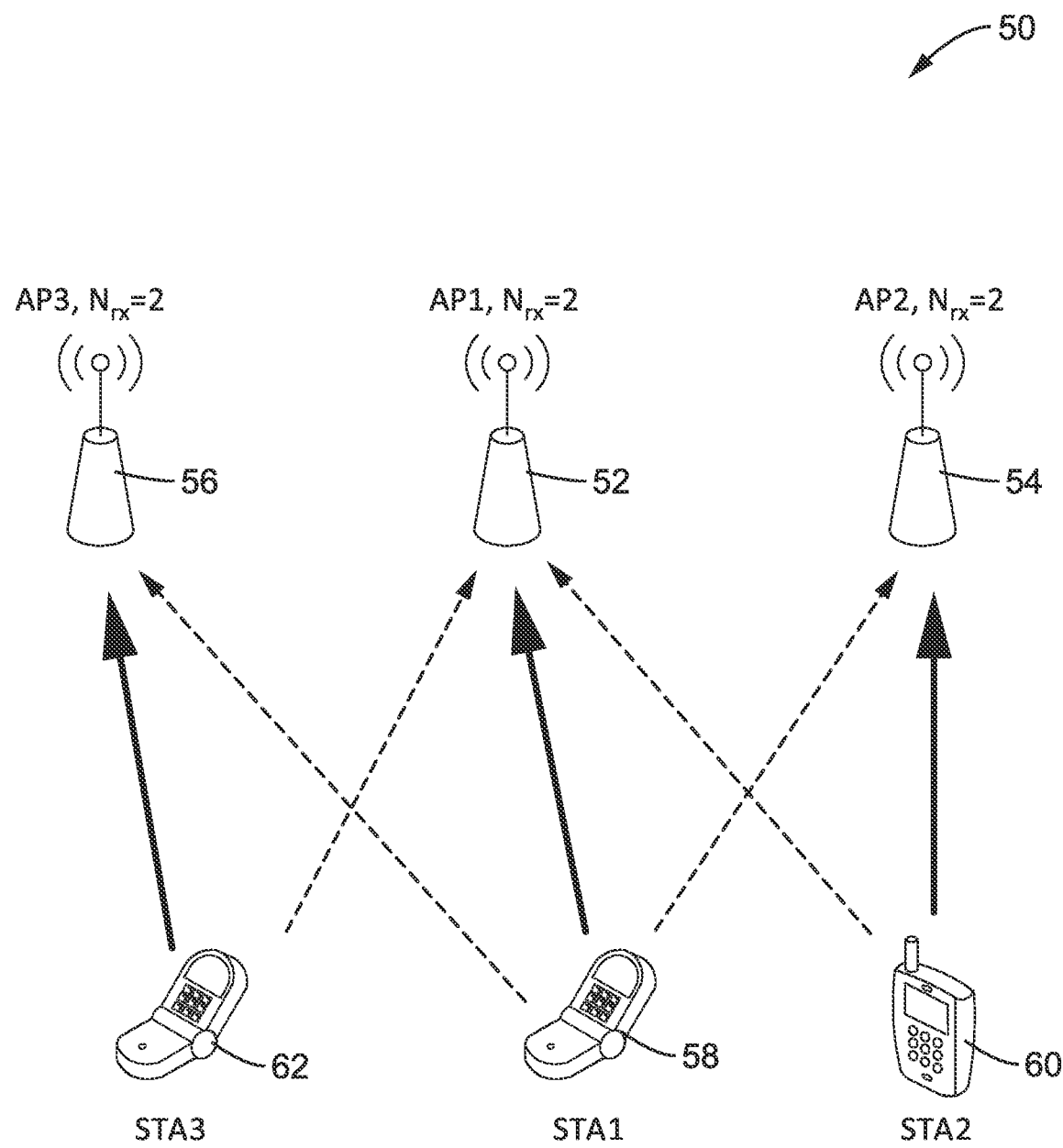
FIG. 5 is an example network topology having multiple APs, each with multiple antennas.

The present disclosure extends the coordinated UL-MU-MIMO scenario with a topology that is shown in FIG. 5. This requires that AP1 has at least three receive antennas, with AP1 assumed to be the primary AP and with AP2 and AP3 being secondary APs according to current terminology. However, AP1 in this case only has two antennas and cannot distinguish between the three different streams. It is assumed that BSS2 (Basic Service Set/cell of AP2), and BSS3 (Basic Service Set/cell of AP3) are not interfering with one another as they are sufficiently far apart in distance.

It will be noted that BSSi is APi's BSS, while STAi is associated with APi. AP1 may infer that some STAs in BSS2 and BSS3 are not in range of each other by observing transmissions from stations from BSS2 and BSS3 overlap in time, or determining it from information provided by AP2 and/or AP3.

This present disclosure describes that scheduled UL resources (in BSS1) can be overlapped with, or be the same, as UORA resources (in BSS2 or BSS3). UORA access in BSS2 and BSS3 is conditional on its interference to AP1 orthogonal to scheduled reception from STA1. For example, the interference from STA2 and STA3 to AP1 is aligned in the unfavored direction(s) of AP1. This becomes a coordinated UL-MU-MIMO that transmissions from BSS2 and BSS3 are UORA transmissions and transmission from BSS1 is a scheduled transmission, such that UORA responding criteria in later sections provides an interference check of BSS2 and BSS3 not interfering with one another, and interference check of each of BSS2 and BSS3's UORA transmissions not interfering with BSS1's scheduled transmission.

2. Communication Station (STA) Hardware Embodiments

Figure 4:
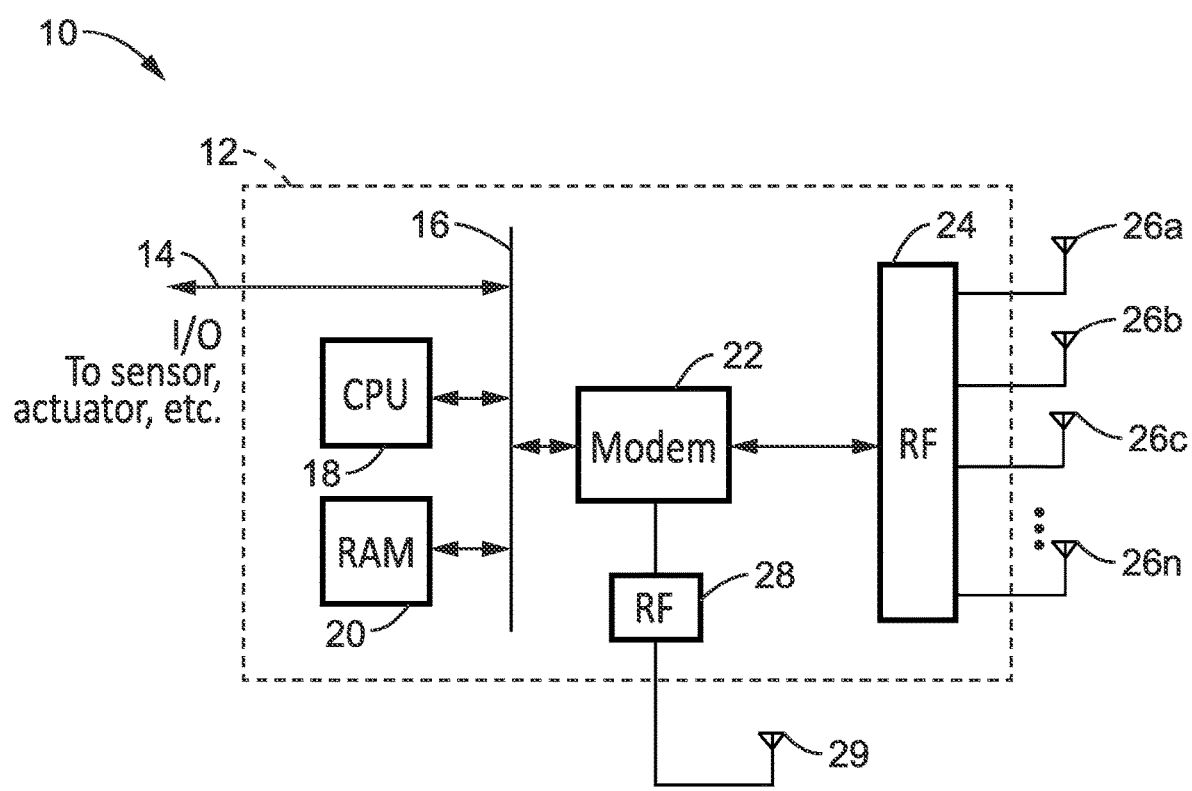
FIG. 4 is a hardware block diagram of wireless station (STA) hardware according to at least one embodiment of the present disclosure.

FIG. 4 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implement the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. The present disclosure is primarily directed at the sub 6 GHz band.

It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

3. Detailed Outline of Present Disclosure

The use of AP trigger frames (TFs) not containing UORA assignment allows the scheduled stations to access the channel. The use of AP trigger frames (TFs) containing UORA assignment allows un-scheduled stations to access the channel of UORA random access RU. In the present disclosure this UORA access is made more conditional so that it will not interfere with other scheduled accesses by another AP.

Below is a basic outline which describes numerous characteristics and aspects of the present disclosure, as a number of "Descriptions". The following sections will unpack and discuss these outline elements, and the description numbers below will be referred back to in portions of the present disclosure.

1. A primary AP1 may transmit a trigger frame to schedule a short UL transmission from an associated STA1 j, where value j is from 1 to m (j=1~m) for AP1 to estimate a spatial filter used in (2)(a)(i) below, and for one or more secondary APi (i>1) to estimate spatial filters used in (2)(b)(ii) below. The value "m" is the number of STAs scheduled by AP1.
   1.(a) The APi may perform estimation of spatial filters for different STA1 j that are scheduled at different frequency resources, n is the total number of AP/BSS's participating in the joint PPDU transmission in (2) below; while "n" is greater than or equal to "i" which is greater than or equal to one (n>i>1);
   1.(b) The primary AP1 may sent another Trigger Frame to schedule a joint PPDU in (2), after the short UL transmission;
   1.(c) The identities of APi may be indicated by the trigger frame in (1) or (1)(b), or may be known by a separate signal before (1);
   1.(d) The scheduled short transmission may contain multiple spatial streams.
2. After the short UL transmission, the primary AP1 and secondary APi's(i>1) may jointly transmit a joint PPDU containing one or more trigger frames. Within the PPDU:
   2.(a) The primary AP1 in BSS1 sends a signal that composes two or more sub-signals in a frequency resource j.
      i. One of the sub-signals A1j may be precoded using a subspace of the spatial filter that was estimated in (1) and will be used to receive UL data from the STA 1j associated with the AP1;
      ii. One of the sub-signals B1j may be precoded using a subspace that is orthogonal to the sub-signal A1;
   2.(b) One or more secondary APi in BSSi (i>1) may send a signal that compose two or more sub-signals in the same frequency resource. This may happen at the same time as step (2)(a);
      i. Secondary APs may be selected by the primary AP such that secondary APs don't have overlapping coverage with each other
      ii. One of the sub-signals Bij sent by APi (i>1) may be precoded using the estimated spatial filter that was estimated for receiving UL data from the STA 1j in (1);
      iii. One of the sub-signals Aij sent by APi (i>1) may be precoded using a subspace that is orthogonal to the sub-signal Bij;
   2.(c) Aij, Bij (i≥1) for a fixed j may be channel estimation signals for a frequency resource j of a PPDU corresponding to different rows of a P matrix, i.e., they are orthogonal to each other for different i, and orthogonal between Aij and Bij for the same i:
      i. The frequency resource in (2)(a) and (2)(b) may be the frequency resource used by STA1 j in step 1. Aij and Aik (j≠k) may be transmitted on different frequency resources. Bij and Bik (j≠k) may be transmitted on different frequency resources. Aij and Bgj for different i (i≠g) may be transmitted on the same frequency resource for the same resource j.
   2.(d) Denote Ai as one of the channel estimation signals transmitted by APi that comprises Aij for all different j's (i.e., frequency resources). Bi is denoted as one of the channel signals transmitted by APi that comprises Bij for all different j's (i.e., frequency resources).
   2.(e) The joint PPDU may have an indication that STAs in BSSi (i≥1 with AP being APi) need to decode this PPDU. The indicator may be in the PPDU header/preamble. For example: the indication may be a special BSS color;
   2.(f) The data portion (e.g., data field carrying trigger frame TF-i from APi) in the PPDU transmitted by APi may contain a trigger frame from each of the APi (i≥1);
      i. The resource assignment in the joint PPDU for each APi (i>1) may be carried in the trigger frame sent in (1) or (1)(b) from the primary AP;
   2.(g) The spatial streams represented by Ai and Bi of the joint PPDU transmitted by APi may have the same content. i.e., the two spatial streams have the same PSDU that contains the trigger frame TF-i;
   2.(h) The channel used to decode the data portion of the PSU in (g) may be estimated by Ai and Bi (i≥1) for a STA that receives the PPDU from APi;
   2.(i) The preamble of the joint PPDU may contain information for a STAij to locate the frequency resource carrying the Trigger frame sent by APi:
      i. For example, the preamble has AP i's ID associated with a Resource Unit index.

3. The channel used to decode the data portion of the joint PPDU in 2 may be estimated using Ai and Bi (i>=1) for a STAij associated with APi, based on the frequency resource x used for carrying the data portion from APi (i.e., Aix, Bix).
4. The trigger frame TF-1 in (2)(f) may contain the UL assignment/scheduling information for STA1 j associated with AP1, and Trigger frame TF-i (i>1) may contain UL assignment/scheduling information for scheduled, or UORA STAs STAik associated/unassociated with APi attempting to access APi. The assignment for STA1 j and UORA STAik may overlap fully or partially in time and/or frequency resource;
4.(a) The UL RU assignment for STA1 j associated with AP1 in TF-1, may be the same as the UL RU assignment of the short UL transmission in (1);
4.(b) The number of spatial stream assignment for STA1 j associated with AP1 in TF-1 may be the same as the number of spatial stream assignment of the short transmission in (1)(d).
5. The APi may use a spatial filter corresponding to Aij (j correspond to a frequency resource) to receive UL transmission. The UL transmission may be scheduled transmission or UORA transmission.
6. A UORA STAjk intends to perform UORA access in BSSj may determine the UORA assignment as eligible/ineligible based on one or more thresholds and comparing an output of a function of signal strengths of all or subset of A1, B1, Ai, Bi (i>1) with the threshold:
6.(a) Ineligible resource assignment does not decrease OCW counter as in 11ax.
7. Denote $RSSI_{dB}^{u,j,k}(A_i)$ as the RSSI of signal Ai in a UORA resource u in dBm received by STAjk, Denote $RSSI_{dB}^{u,j,k}(B_i)$ as the RSSI of signal Bi in a UORA resource u in dBm received by STAjk.
8. The function in 6 for a UORA STAjk in BSSj may be $\Sigma_{i=1}^{n}(C_{iju} \times RSSI_{dB}^{u,j,k}(A_i) + D_{iju} \times RSSI_{dB}^{u,j,k}(B_i))$ and it is greater than a threshold:
8.(a) $C_{iju}$ is a weighting factor for part of a STAjk's signal strength that will be received by APi with a spatial filter at resource u for UL transmission the AP intends to receive. If i=j, the APi likely receives the part of signal as intended signal, if i≠j, the APi likely receives the part of the signal as interference.
8.(b) $D_{iju}$ is a weighting factor for part of a STAjk's signal strength that will be unlikely to be received by APi with a spatial filter at resource u for UL transmission the AP intends to receive. If i=j, the APi unlikely receives the part of the signal as intended signal, if i≠j, the APi is unlikely to receive this part of the signal as interference.
8.(c) n is the max number of i, for example the total number of AP/BSS's participated in the joint PPDU transmission.
8.(d) Another possible function in (6) may be $\Sigma_{i=1}^{n}(RSSI^{u,j,k}(A_i))^{C_{iju}}(RSS^{u,j,k}(B_i))^{D_{iju}}$, where RSSI is in mW instead of dBm.
8.(e) Alternatively, each $RSSI_{dB}^{u,j,k}(A_i)$ $RSSI_{dB}^{u,j,k}(B_i)$ for different i may be associated with a threshold, and each with a comparison criterion (less than, greater than . . . ). The criteria for all $RSSI_{dB}^{u,j,k}(A_i)$ $RSSI_{dB}^{u,j,k}(B_i)$ of different i are satisfied for this RU u of this STA in BSSj, then this RU u is considered eligible.
9. The $C_{jju}$ for UORA STA in (8) may be equal to or greater than 0. The $C_{iju}$s with i≠j for UORA STA in (8) may be equal to or less than 0, the $D_{jju}$ for UORA STA in (8) may be equal to or less than 0, the $D_{iju}$s with i≠j for UORA STA in (14) may be equal to or greater than 0.
10. n in (8) may be implicitly indicated by the number of channel estimation signals of the PPDU in (2)(c) to the non-AP STAs. For example, n is half of the number of channel estimation signals.
11. APj may signal in a broadcast message $C_{iju}$s and $D_{iju}$s and/or threshold in (6) for the UORA STAs of BSSj to use in the function of (8).
12. The $C_{iju}$s $D_{iju}$s in (8) and/or threshold in (6) for i,j=1 . . . n may be signaled in the joint PPDU in (2).
13. The sum of the number of spatial streams of scheduled UL transmission by AP1 (e.g., from STA1j in (5) and the number of UORA STAs using the same time and frequency resource in OBSS may exceed the number of receive antennas of AP1.
14. In the trigger frames in (2), the assigned channel estimation signals in the TB-PPDU for the STAs accessing from different BSSs but occupying the same time/frequency resource may be orthogonal.
14.(a) The trigger frame in (1) or (1)(b) may contain the information to coordinate the UL assignment from different APs for data transmission.

4. Conditional UORA Timeline

FIG. 5 illustrates a topology 50 utilized in OBSS UORA scenarios for consideration in the examples of the present disclosure. The figure is provided to aid in the discussions of the techniques involved and toward engendering an improved understanding of the proposed technology. It should be appreciated that the present disclosure is in no way limited to the topology of this example, as the protocol may be utilized on communications between WLAN STAs and MLDs of many desired topologies.

In the figure AP1 52 is considered the primary AP, while AP2 54 and AP3 56 are considered secondary APs. STA1 58, STA2 60 and STA3 62 are seen communicating with the APs, as depicted by the solid lines. The dashed lines are the potential interference to the neighboring APs. The solid lines represent communications that are triggered by trigger frames in a joint PPDU.

Figure 6:
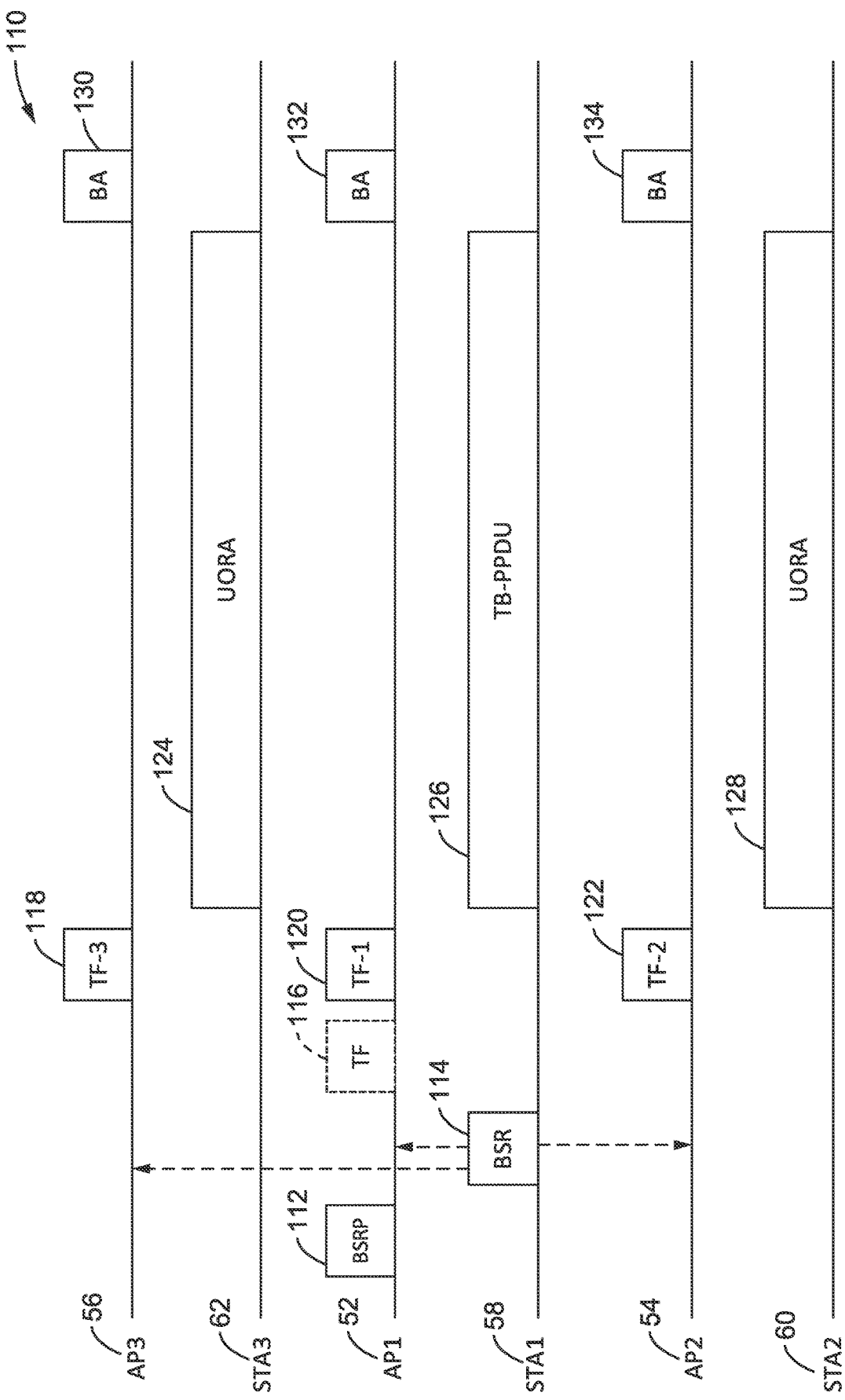
FIG. 6 is a communications diagram of a conditional UORA transmission performed according to at least one embodiment of the present disclosure.

FIG. 6 illustrates an example embodiment 110 of a coordinated UL-MU-MIMO with conditional UORA transmissions of the present disclosure. Interactions are seen between AP1 52, AP2 54, AP3 56, STA1 58, STA2 60 and STA3 62.

In general, AP1 is telling STA1 to send a short PPDU, and it intends that AP2 and AP3 can recognize what STA1 is sending to learn the spatial filter to remove the interference from STA1. AP2 and AP3 each have two antennas to hear (receive) STA1 and adjust their phase differences (i.e., a spatial filter) to obtain minimum energy from this BSR. AP2 and AP3 are using the spatial filter to determine between an unfavored direction and use the remainder of the dimension as a favored direction. AP1 which has two antennas also uses STA1's short PPDU to determine a spatial filter that maximizes the received energy from STA1, and the spatial filter is used to determine a favored direction, while the rest of the directions are unfavored directions. The use of the reciprocity principle allows an AP to later send channel estimation signals beamformed using the filter weights of favored and unfavored directions in DL to let potential UORA STAs in BSS2 and BSS3 determine whether they are in a favored or unfavored direction of each AP.

BSRP 112 is utilized as the initial trigger frame, and BSR 114 is a QoS null frame, as seen in Description 1 of Section 3. Other trigger frames, aside from BSRP, can be similarly utilized to trigger the short transmission such as BQRP. Other frames/PPDUs can be used as the UL short transmission, such as BQR in a QoS null frame, QoS Null frame, or a NDP PPDU. The dashed lines represent the short PPDU observed by AP2 and AP3 as described in the previous paragraph for deriving their spatial filters.

As seen in the figure, AP1 may trigger multiple spatial streams in the short UL transmission. TF 116 is depicted with a dashed outline to indicate it is an optional TF as found in Description (1)(b) in Section 3.

TF-1 120, TF-2 122, and TF-3 118 are the Trigger frames sent by AP1, AP2 and AP3 in the joint PPDU in Description (2) of Section 3. In this example, there is only 1 Resource unit (RU) as the resource u in Description (8) of Section 3. This resource is assigned by AP2 and AP3 as a UORA RU in TF-2 and TF-3, respectively, and assigned by AP1 as a scheduled UL RU in TF-1. STA2 determines the RU as being eligible, such as by satisfying the conditions in Description (6) in Section 3, and the UL-OFDMA Backoff (OBO) counter reaches zero. In response to this, STA2 performs a UORA transmission 128. Similarly, STA3 also determines the RU as eligible and its OBO counter has reached zero, whereby STA3 performs UORA transmission 124. STA1 is shown performing a scheduled UL TB-PPDU transmission 126. Each of the receiving stations is seen sending a block acknowledgement (BA) 130, 132 and 134.

5. Conditional UORA Joint PPDU

Figure 7:
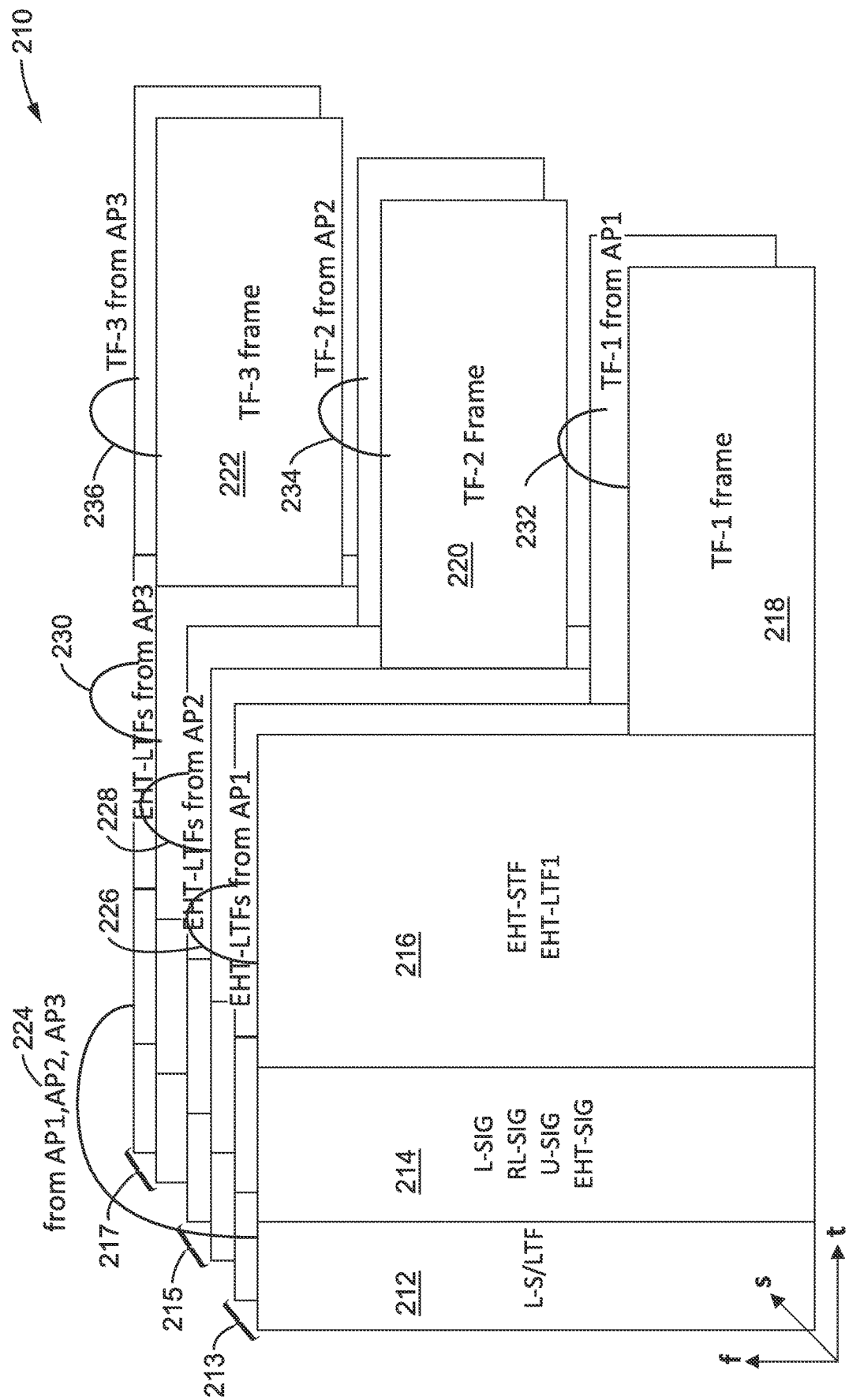
FIG. 7 is a communications partition diagram of a conditional UORA-3 joint PPDU, according to at least one embodiment of the present disclosure.

FIG. 7 illustrates an example embodiment 210 of a conditional UORA joint PPDU that is used to carry TF-1, TF-2, TF-3 described in the previous paragraph. The topology of this slide is the same as in FIG. 5, and the timeline is the same as seen in FIG. 6.

In the joint PPDU axis "s" stands for space, axis "t" stands for time, and axis "f" stands for frequency. In the example figure, each APi partitions its antenna precoding to two subspaces, seen as 213 for AP1, 215 for AP2 and 217 for AP3, one subspace is used for the antenna precoding for Ai (favored directions), the other is used for antenna precoding for Bi (unfavored directions). As there are three APs in this example, there are a total of six 6 layers/spatial streams shown in the spatial domain. For two layers/spatial streams in the space domain from the same AP, the AP may apply different cyclic delays on each layer to avoid unintended beamforming due to the same signal from different spatial streams.

The joint PPDU has a legacy L/STF 212, and L-SIG 214 as defined in clause 17 of IEEE P802.11-REVme™/D0.0 Part 11: Wireless LAN Medium Access Control (MAC) and Physical Layer (PHY) Specifications 802.11.

After L-SIG, there is RL-SIG 214 as defined in clause 36 of the 802.11be reference paper: IEEE P802.11Be™/D1.1, Draft Standard for Information technology—Telecommunications and information exchange between systems Local and metropolitan area networks—Specific requirements Part 11: Wireless LAN Medium Access Control (MAC) and Physical Layer (PHY) Specifications, Amendment 8: Enhancements for extremely high throughput (EHT). The specific setting of L-SIG length and RL-SIG signals for an EHT PPDU are also described in that paper. The U-SIG and EHT-SIG are also defined in clause 36 of the above paper and are sent after RL-SIG. The EHT-SIG contains the RU index for AP1, AP2 and AP3. The use of EHT PPDU as a joint PPDU is for illustration only and the principle can be applied to another amended PPDU format which is capable of sending multiple orthogonal channel estimation signals and multiplex frames (trigger frames) from different transmitters.

The content, Modulation Coding Scheme (MCS), and length are the same for L-SIG, RL-SIG, U-SIG, EHT-SIG transmitted by AP1 through AP3 on each layer/spatial stream. The settings may be specified in the initial TF in Description (1) or optional TF in (1)(b) in Section 3.

A special BSS color in U-SIG may signal this is a joint PPDU that STAs intending to access AP1 through AP3 will need to decode. It will be noted that BSS color, also known as BSS coloring, is a method for identifying overlapping basic service sets (OBSSs).

The EHT-STF 216 and EHT-LTF 216 are defined in the above 802.11be reference. EHT-LTF 216 is sent after EHT-SIG 214 and after EHT-STF. The two EHT-LTFs from APi are Ai and Bi are as indicated in Description (2)(d) of Section 3. It is implicit that one of the two EHT-LTFs with lower index is Ai, while the other is Bi. To be precise, in this example: A1=EHT-LTF1, B1=EHT-LTF2, A2=EHT-LTF3, B2=EHT-LTF4, A3=EHT-LTF5, B3=EHT-LTF6.

The precoding vector for Ai and Bi for the two EHT-LTFs from APi may be estimated based on the reception of the UL short transmission, for example, by using Method A described in Table 1, or Method B described in Table 2.

There are three RUs in the joint PPDU, each has a PSDU carrying Trigger Frames (e.g., TF-i, with i=1 to 3), seen as 218, 220, 222 from AP1, AP2 and AP3. The same PSDUi is transmitted by each APi on both spatial streams represented by Ai and Bi. The non-AP STAs in each BSSi may use both EHT-LTFs Ai and Bi to estimate the channel to decode the PSDUi. In this example, each TF-i only schedules 1 RU for transmissions 124, 126, and 128 in FIG. 6 that occupies the same BW as the joint PPDU, but in other examples they may have assignments to multiple RUs that occupy a total BW which is the same or smaller than the joint PPDU.

In this example, TF-1 contains a scheduled UL transmission assignment for STA1, TF-2 and TF-3 contains UORA assignment for the same RU. The STAs intending to access AP2 and AP3 by UORA use the criteria in Description (6) of Section 3, to determine whether this is an eligible RU.

STA2 and STA3 in BSS2 and BSS3, by way of example and not limitation, have determined that this is an eligible RU and for which its OBO counter has counted down to a terminal count of zero.

6. Conditional UORA Response Criteria

Figure 8:
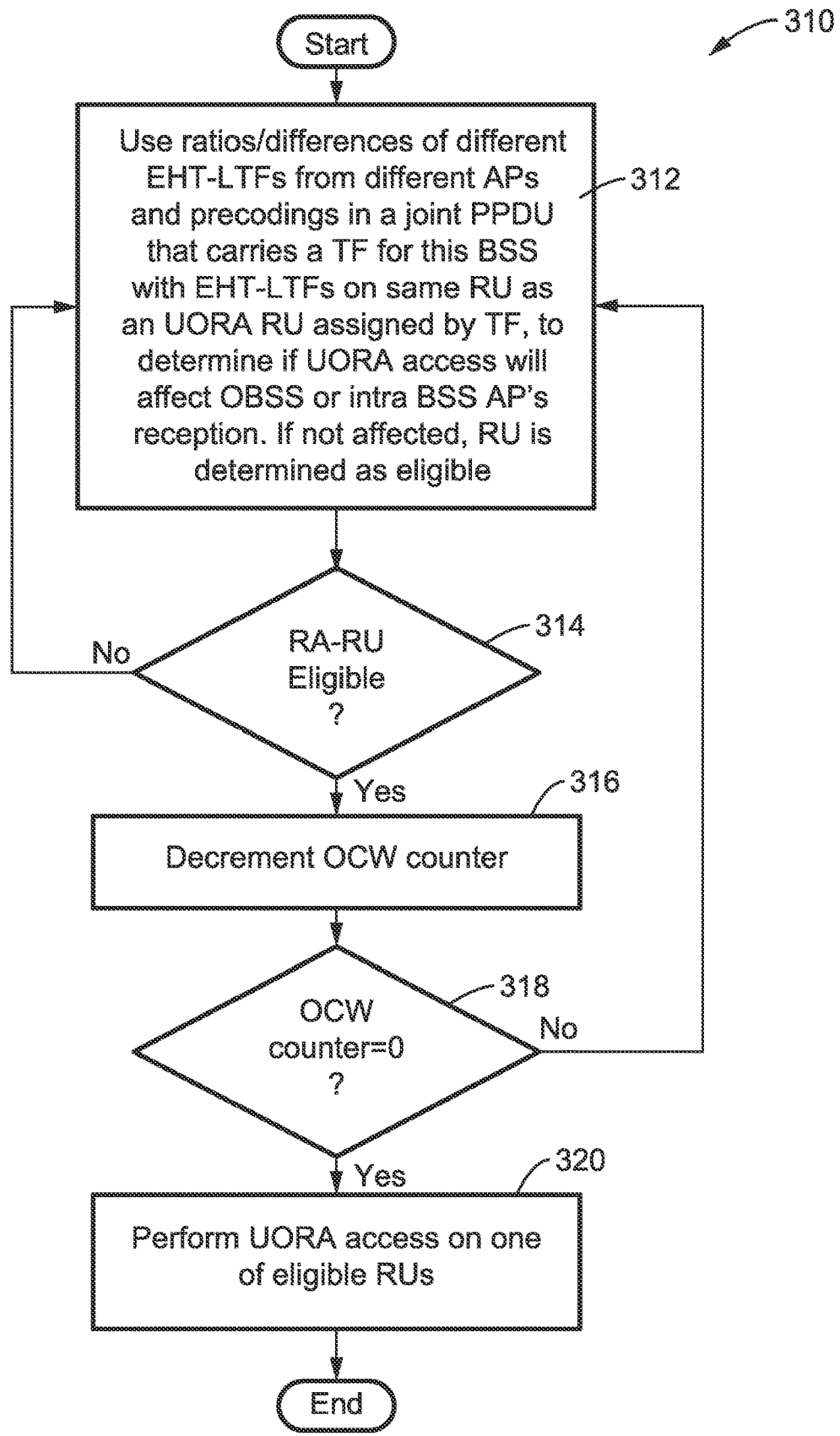
FIG. 8 is a flow diagram of a station (STA) performing a UORA operation according to at least one embodiment of the present disclosure.

The topology of this case is the same as in FIG. 5, and the timeline is the same as in seen in FIG. 6, and logic is as seen in FIG. 8.

Because there is only 1 RU, the protocol of the present disclosure does not index the u in $C_{iju}$, and $D_{iju}$. An AP broadcasting the coefficients may determine that $C_{iju}$, are the same for different u's and for the same i and j. Similarly, the AP may determine that $D_{iju}$, are the same for different u's and the same i and j.

APj (j=2,3) broadcasts $C_{ij}$ and $D_{ij}$ with i=1 through 3, $C_{2,3}=D_{2,3}=D_{1,3}=D_{1,2}=C_{3,2}=D_{3,2}=D_{2,2}=D_{3,3}=0$, $C_{1,3}=C_{1,2}=-1$, $C_{2,2}=C_{3,3}=1$ and the threshold value that is used for comparison in Description (6) of Section 3.

STA1, STA2, and STA3 receive a joint TF in an EHT format PPDU. STA n uses a combined channel estimated from LTF(2n−1) LTF(2n) to receive TF-n.

Based on the broadcast coefficient, STA2 only decreases the UORA OBO counter for the UORA RU which has RSSI_db(EHT-LTF3)-RSSI_dB(EHT_LTF1) being greater than a threshold (i.e., the RU with the LTF signal strength satisfying the above criteria is considered eligible for UORA access. Alternatively, if RSSI_dB(EHT-LTF3) is greater than threshold1 and RSSI_dB(EHT-LTF1) is less than threshold2, can be used to determine whether the UORA RU is considered eligible.

In this example, EHT-LTF4 is not used as UORA responding criteria, but it can be added as outlined in Description (8) of Section 3.

STA3 only decrements its UORA OBO counter for the RU when RSSI_db(EHT-LTF5)-RSSI_dB(EHT-LTF1) is above a given threshold. Alternatively, this can be done with RSSI_dB(EHT-LTF5) is above threshold1 and RSSI_dB (EHT-LTF1) is less than threshold 2.

LTF6 is not used as UORA responding criteria, but it can be included as a criterion as outlined Description (8) in Section 3.

The example can be generalized with STA 1 and STA2 having scheduled coordinated UL MU-MIMO and STA3 using conditional UORA.

7. Flow Diagrams of UORA Operations

FIG. 8 illustrates an example embodiment 310 of operation of a UORA STA. In block 312 the ratios/differences of different EHT-LTFs from different APs and precodings in a joint PPDU that carries a TF for this BSS with EHT-LTFs on the same RU as an UORA RU assigned by the TF, is utilized to determine if UORA access will affect OBSS or intra BSS AP reception. If not affected, then the RU is considered to be eligible.

In block 314 a check is made if the RA-RU is eligible based on Description (6) of Section 3. If it is not eligible, then execution returns to block 312; otherwise, the OCW counter is decremented 316, followed by a check 318 for a terminal count (e.g., count=0). If a terminal count has not been reached, then execution returns to block 312. Otherwise, block 320 is reached and UORA is performed on one of the eligible RUs.

Figure 9:
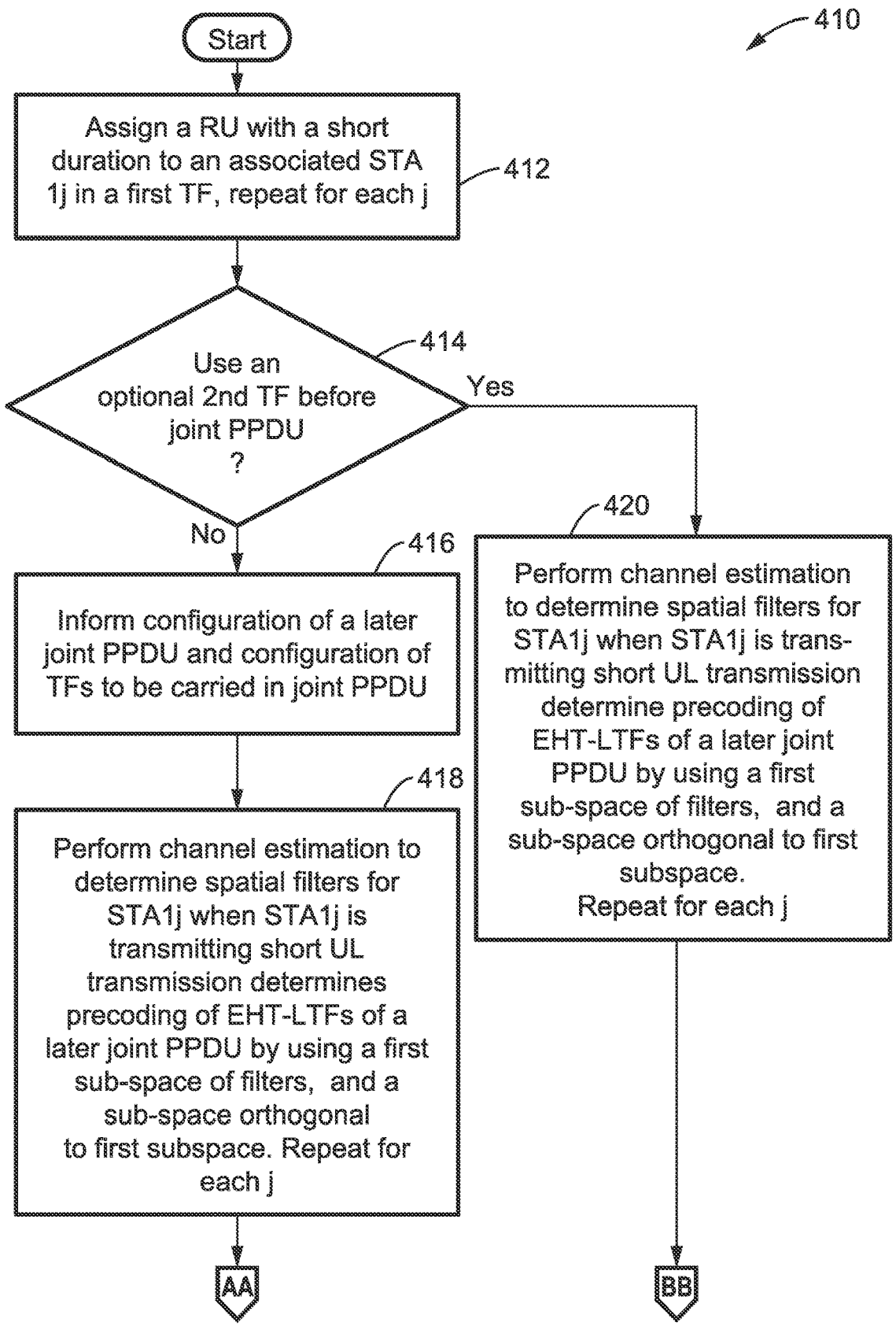
FIG. 9 and FIG. 10 is a flow diagram of a primary AP (e.g., AP1) performing UORA operations according to at least one embodiment of the present disclosure.
Figure 10:
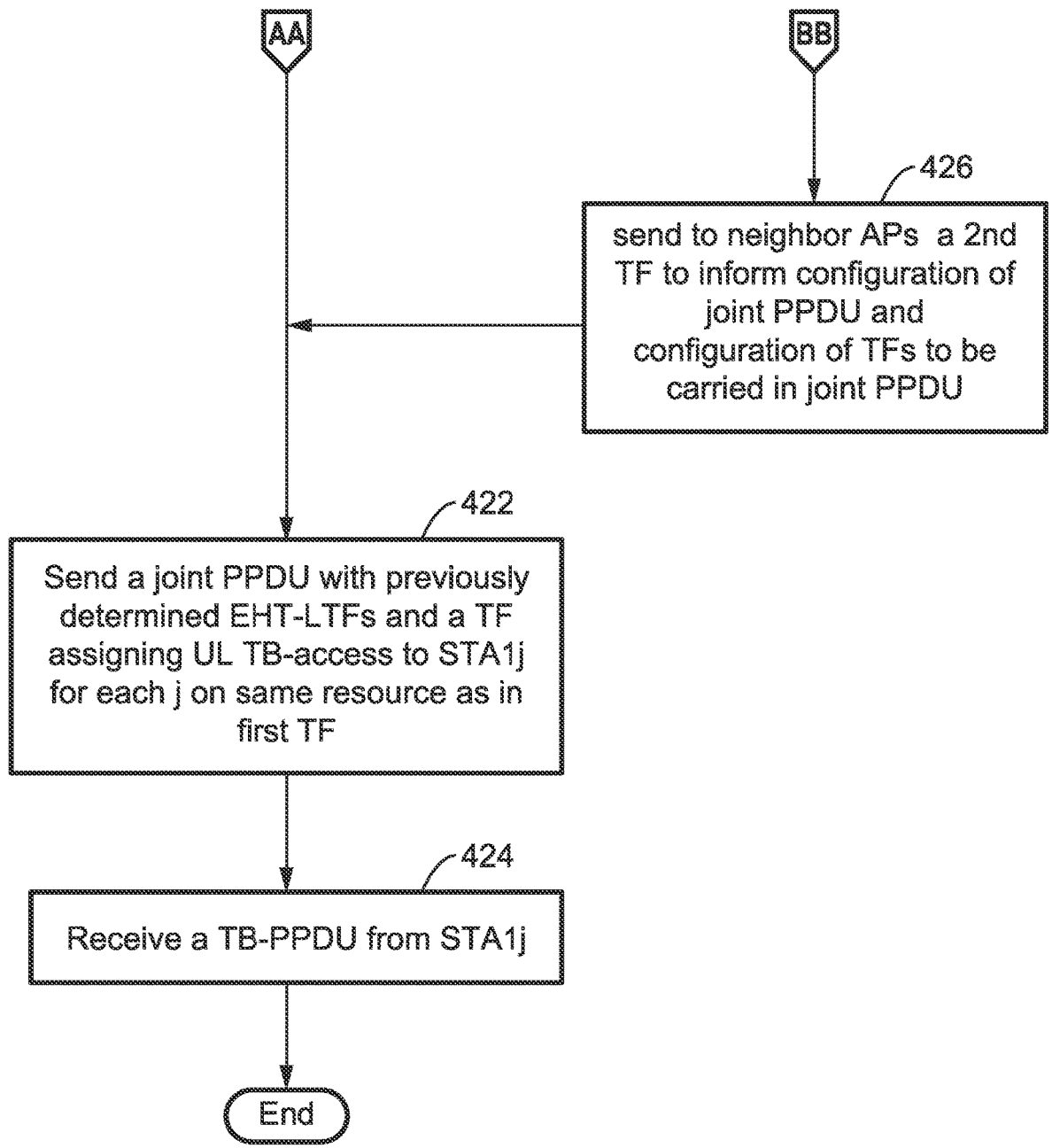

FIG. 9 and FIG. 10 illustrate an example embodiment 410 of operation of AP1 in relation to the coordinated UL-MU-MIMO operations. A RU is assigned 412 with a short duration to an associated STA 1j in a first/initial TF, and is repeated for each j.

Check 414 determines whether or not to use an optional second TF before the joint PPDU. If a second TF is not to be used, then at block 416 AP1 informs AP2 and AP3 of the configuration of a later joint PPDU and configuration of TFs to be carried in the joint PPDU. Then in block 418 channel estimation is performed to determine spatial filters for STA1j when STA1j is transmitting a short UL transmission. In addition, it determines precoding of EHT-LTFs of a later joint PPDU by using a first subspace of the filters, and a subspace orthogonal to the first subspace. This is repeated for each j. Then at block 422 in FIG. 10, a joint PPDU is sent with previously determined EHT-LTFs and a TF assigning UL TB-access to STA1j for each j on the same resource as in the first TF. Then AP1 should receive 424 a TB-PPDU from STA1j.

Returning now to block 414 in FIG. 9, in the case of AP1 deciding to send a second TF before the joint PPDU in which execution reaches block 420; which performs channel estimation to determine spatial filters for STA1j when STA1j is transmitting a short UL transmission. It determines precoding of EHT-LTFs of a later joint PPDU by using a first subspace of the filters, and a subspace orthogonal to the first subspace; and repeats this for each j.

Then execution reaches block 426 of FIG. 10, which sends to neighbor APs a second TF to inform them of the configuration of the joint PPDU and configuration of TFs to be carried in the joint PPDU, then execution moves to block 422 which has already been discussed.

Figure 11:
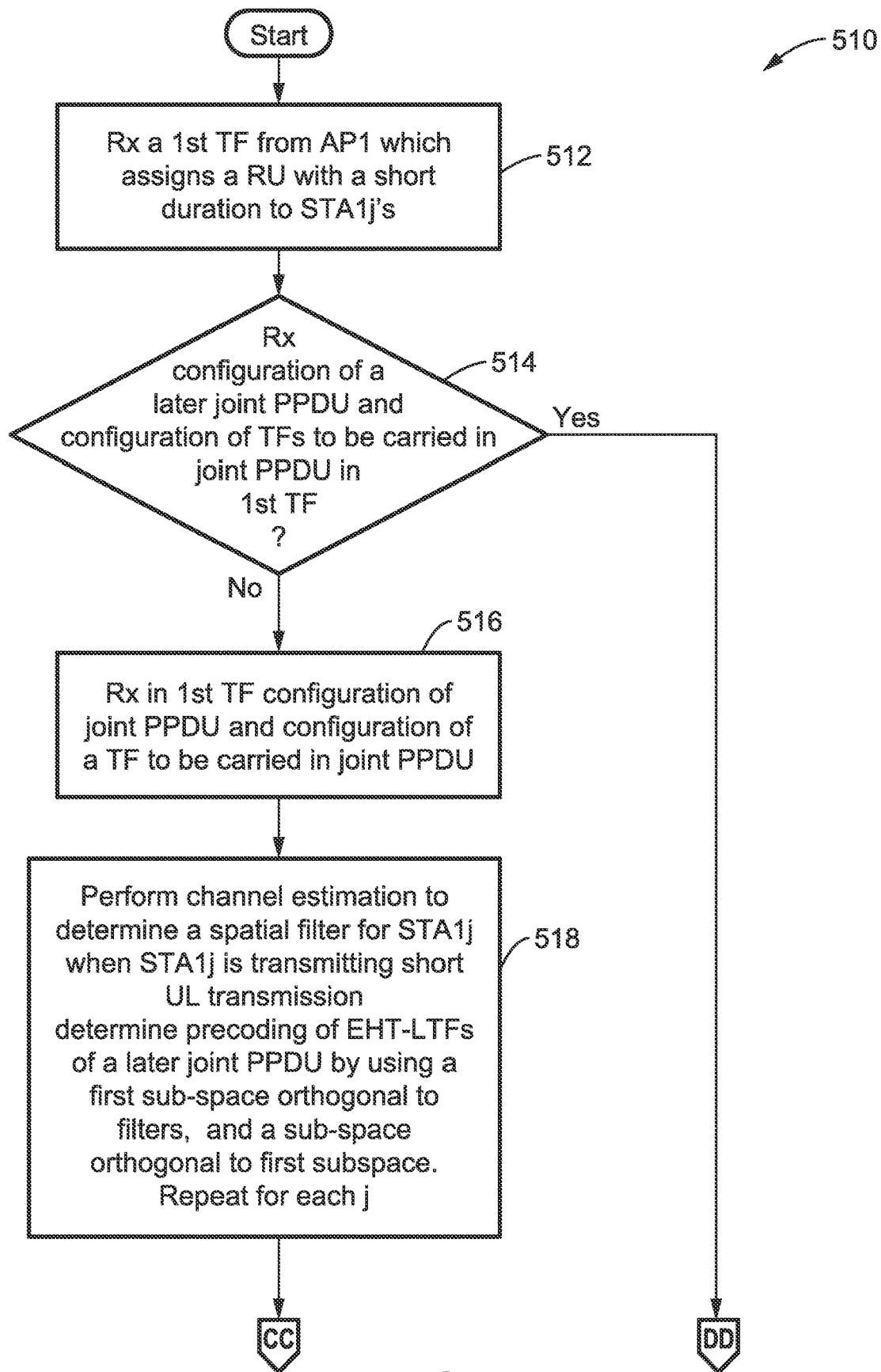
FIG. 11 and FIG. 12 is a flow diagram of a secondary AP (e.g., APi) performing UORA operations according to at least one embodiment of the present disclosure.
Figure 12:
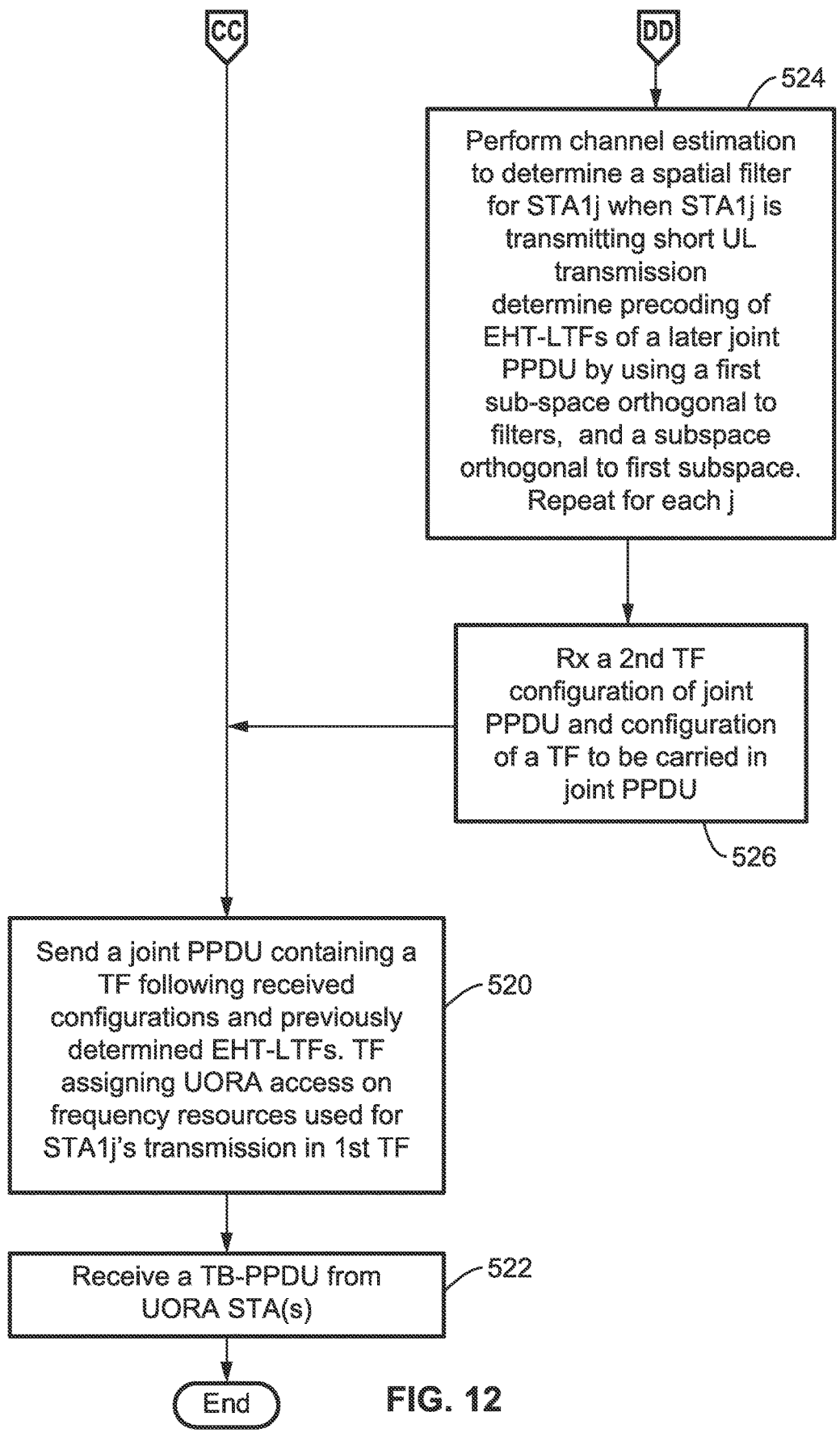

FIG. 11 and FIG. 12 illustrate an example embodiment 510 of secondary APi (i>1) in relation to UORA operations. A first TF is received 512 from AP1 which assigns a RU with a short duration to STA1j's. At block 514 the receiver configuration of a later joint PPDU is determined along with the configuration of the TFs to be carried in the joint PPDU in the first TF. If it receives in the first/initial TF the configuration of a later joint PPDU and configuration of the TF to be carried in the joint PPDU, then it moves to block 516, otherwise it moves to block 524.

If it is determined at block 514 that the configuration of a later joint PPDU and configuration of the TF to be carried in the joint PPDU are received, then at block 516 a first TF configuration is received of a joint PPDU and a configuration of a TF to be carried in the joint PPDU. Then at block 518 channel estimation is performed to determine a spatial filter for STA1j when STA1j is transmitting a short UL transmission. Precoding of EHT-LTFs of a later joint PPDU is then determined by using a first sub-space orthogonal to the filters, and a sub-space orthogonal to the first subspace; and this is repeated for each j. Then execution reaches block 520 of FIG. 12 which sends a joint PPDU containing a TF following the received configurations and previously determined EHT-LTFs; with the TF assigning UORA access on frequency resources used for STA1j's transmission in the first TF. Then in block 522 a TB-PPDU is received from UORA STA(s).

Returning now to block 514, in the case of the configuration of a later joint PPDU and configuration of the TF to be carried in the joint PPDU are received, execution moves to block 524 in FIG. 12 in which channel estimation is performed to determine a spatial filter for STA1j when STA1j is transmitting a short UL transmission; and to determine precoding of EHT-LTFs of a later joint PPDU by using a first subspace orthogonal to the filters, and a subspace orthogonal to the first subspace; and to repeat this for each j. Then at block 526 a second TF is received with the configuration of the joint PPDU and configuration of a TF to be carried in the joint PPDU. Then execution reaches block 520 which was already described.

8. Frame Format Extensions

Figure 13:
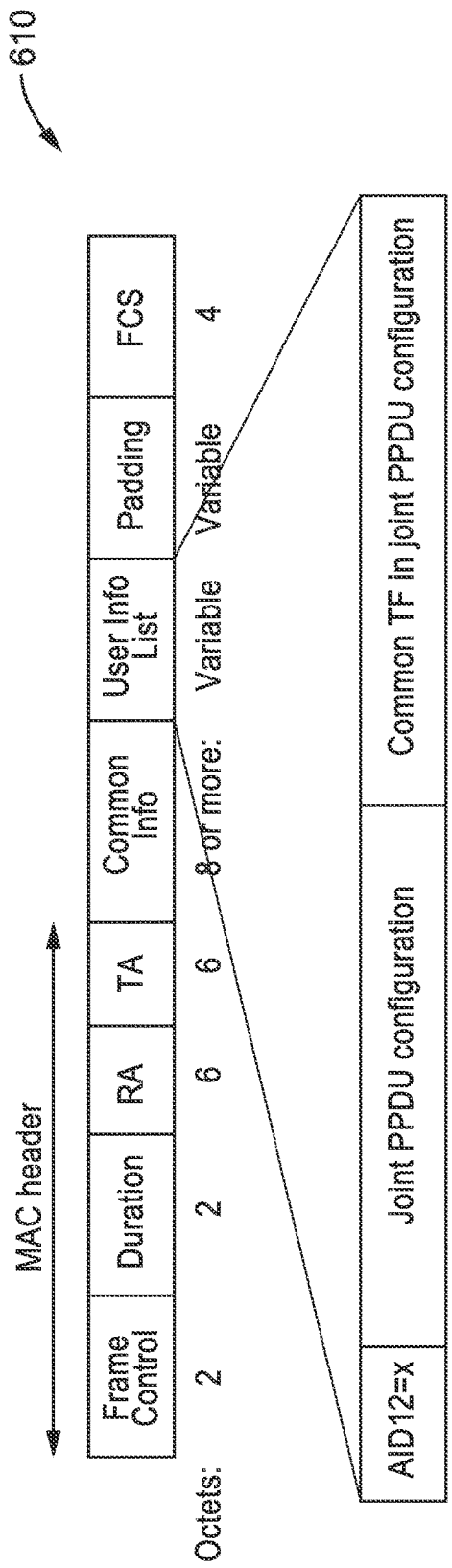
FIG. 13 is a data field diagram of a Trigger Frame (TF) depicting extensions according to at least one embodiment of the present disclosure.

FIG. 13 illustrates an example embodiment 610 of extensions to the initial TF as in Description (1) or optional TF (1)(b) in Section 3. A trigger frame (TF) is shown with its MAC header and other fields including the User Info List field, which is shown expanded in the lower area of the figure. Subfield AID12=x is preconfigured to be read by neighboring APs, such as AP2 and AP3.

A joint PPDU configuration subfield indicates the contents in L-SIG, U-SIG, EHT-SIG and MCS, duration of EHT-SIG, and EHT-LTF indices for APi (e.g., where i=2, 3, . . . n). A joint PPDU configuration may also signal the power that the APi should use in transmitting the joint PPDU. For example, lower power limits of a conditional UORA provide access to STAs closer to the APi's to perform UORA.

A joint PPDU configuration or common TF in joint PPDU configuration may also signal coefficients and thresholds of the function described in Description (8) of Section 3.

In the joint PPDU configuration subfield, the contents in the preamble of the joint PPDU may specify an identification (ID) APi, (e.g., i=2, 3, . . . n), such as for example an STA_ID converted from BSS color of APi, and the RU and MCS for APi to transmit its PSDUi that carries TF-i in the joint PPDU.

A Common TF in joint PPDU configuration subfield specifies the common information for the TB-PPDU that follows the joint PPDU that carries TF-i's. It should be noted that this subfield may contain information for UL length, TB-PPDU preamble content, Packet Extension (PE) configuration, GI and LTF type, length of HE/EHT-LTF symbols in TB-PPDU, and the indices of HE/EHT-LTF indices in TB-PPDU for each AP.

If the configurations exceed the size limit for a user info field, several consecutive user info fields with the same AID12=x may be utilized for signaling the complete configuration.

Figure 14:
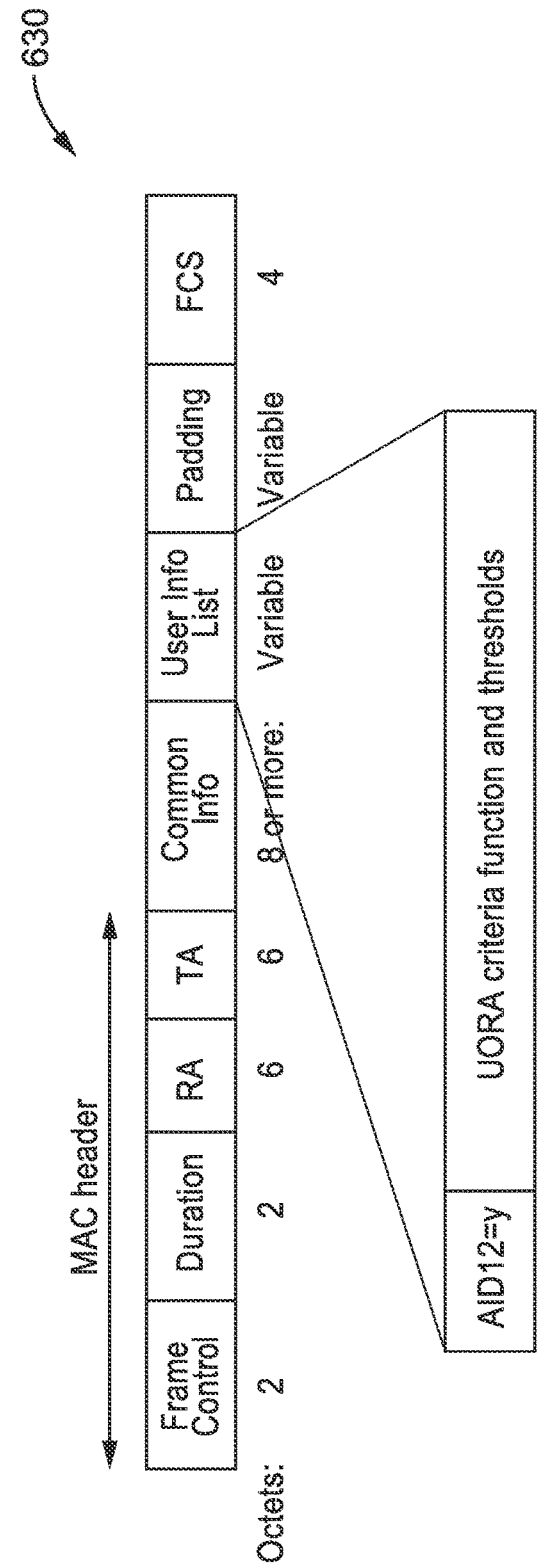
FIG. 14 is a data field diagram of extensions to TF-i carried in a joint PPDU according to at least one embodiment of the present disclosure.

FIG. 14 illustrates an example embodiment 640 of extensions to the TF-i carried in the joint PPDU. A TF-i frame is shown with extensions to the User Infor List field. AID12=y is preconfigured to signal UORA criteria function and thresholds as per Description (8) of Section 3 to the potential UORA STAjk's in Description (6) of that section.

The configuration may be copied from the configuration that signals coefficients and thresholds of the function in Description (8) as was seen for FIG. 13. If the configurations exceed the size limit for a user info field, then several consecutive user info fields with the same AID12=y may be used to signal the complete configuration.

9. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a station, wirelessly communicating with other stations on a wireless local area network (WLAN) in an IEEE 802.11 protocol configured for supporting orthogonal frequency-division multiple access (OFDMA), and uplink OFDMA random access (UORA) over a carrier-sense multiple-access/collision avoidance (CSMA/CA) mechanism; (b) a processor of said station; (c) a non-transitory memory storing instructions executable by the processor for communicating spatial streams with other stations and fulfilling different roles of a communications protocol, in which said station may operate as an access point (AP) which is either a primary AP or a secondary AP, or may operate as a non-access point station (STA); and (d) wherein said instructions, when executed by the processor, perform one or more steps comprising: (d)(i) transmitting a first trigger frame (TF) by said station operating as a primary access point (AP) to schedule a short uplink (UL) transmission from another station, to allow the primary AP and one or more secondary APs to estimate spatial filtering to be utilized in the favorable and unfavorable directions of each of the APs; (d)(ii) jointly transmitting a joint physical layer protocol data unit (PPDU) containing one or more second trigger frames, by the primary AP and one or more secondary APs with channel estimation signals precoded by weights of the spatial filtering; (d)(iii) utilizing the channel estimation signals allows UORA non-AP stations wanting to access secondary APs whether they are in a favored direction or an unfavored direction to each primary and secondary AP and criteria provided to the UORA non-AP stations to determine if they are eligible for UORA access; and (d)(iv) whereby a sum of the number of spatial streams of scheduled UL transmissions by the primary AP and a number of UORA stations using the same time and frequency resource are allowed to exceed a number of receive antennas available in the primary AP.

An apparatus for wireless communication in a network, the apparatus comprising: (a) a wireless communication circuit, as a station, wirelessly communicating with other stations on a wireless local area network (WLAN) in an IEEE 802.11 protocol configured for supporting orthogonal frequency-division multiple access (OFDMA), and uplink OFDMA random access (UORA); (b) wherein each AP, primary AP or secondary APs, partitions its antenna precoding to two subspaces, one for the favored directions and one for the unfavored directions; (c) a processor of said station; (d) a non-transitory memory storing instructions executable by the processor for communicating spatial streams with other stations and fulfilling different roles of a communications protocol, in which said station may operate as an access point (AP) which is either a primary AP or a secondary AP, or may operate as a non-access point station (STA); and (e) wherein said instructions, when executed by the processor, perform one or more steps comprising: (e)(i) transmitting a first trigger frame (TF) by said station operating as a primary access point (AP) to schedule a short uplink (UL) transmission from another station, to allow the primary AP and one or more secondary APs to estimate spatial filtering to be utilized in the favorable and unfavorable directions of each of the APs; (e)(ii) wherein said first TF contains a joint PPDU subfield with information on the channel estimation signals for a subsequent joint PPDU; wherein said first TF can trigger multiple spatial streams; (e)(iii) jointly transmitting a joint physical layer protocol data unit (PPDU) containing one or more second trigger frames, by the primary AP and one or more secondary APs with channel estimation signals precoded by weights of the spatial filtering; (e)(iv) utilizing the channel estimation signals allows UORA non-AP stations wanting to access secondary APs whether they are in a favored direction or an unfavored direction to each primary and secondary AP and criteria provided to the UORA non-AP stations to determine if they are eligible for UORA access; and (e)(v) whereby a sum of the number of spatial streams of scheduled UL transmissions by the primary AP and a number of UORA stations using the same time and frequency resource are allowed to exceed a number of receive antennas available in the primary AP.

A method of performing wireless communications in a network, comprising: (a) performing wireless communications between stations of a wireless local area network (WLAN) in an IEEE 802.11 protocol configured for supporting orthogonal frequency-division multiple access (OFDMA), and uplink OFDMA random access (UORA) over a carrier-sense multiple-access/collision avoidance (CSMA/CA) mechanism; (b) transmitting a first trigger frame (TF) by a primary access point (AP) to schedule a short uplink (UL) transmission from another station, to allow the primary AP and one or more secondary APs to estimate spatial filtering to be utilized in the favorable and unfavorable directions of each of the APs; (c) jointly transmitting a joint physical layer protocol data unit (PPDU) containing one or more second TFs, by the primary AP and one or more secondary APs, with channel estimation signals precoded by weights of the spatial filtering; (d) utilizing the channel estimation signals to allow UORA non-AP stations, wanting to access secondary APs, whether they are in a favored direction or an unfavored direction to each primary and secondary AP and criteria provided to the UORA non-AP stations to determine if they are eligible for UORA access; and (e) whereby a sum of the number of spatial streams of scheduled UL transmissions by the primary AP and a number of UORA stations using the same time and frequency resource are allowed to exceed a number of receive antennas available in the primary AP.

The apparatus or method of any preceding implementation, wherein each AP, primary AP or secondary APs, partitions its antenna precoding to two subspaces, one for the favored directions and one for the unfavored directions.

The apparatus or method of any preceding implementation, wherein said first TF contains a joint PPDU subfield with information on the channel estimation signals for a subsequent joint PPDU.

The apparatus or method of any preceding implementation, wherein said first TF comprises a buffer status report poll (BSRP) frame.

The apparatus or method of any preceding implementation, wherein said first TF is sent by said primary AP and can trigger multiple spatial streams.

The apparatus or method of any preceding implementation, wherein in response to one of the second TFs for determining eligibility for a UORA access by a non-AP station, the OFDMA count window (OCW) counter is updated and if a terminal count is reached and UORA is performed on one of the eligible RUs.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Precoding Vector - Method A

Method A:
$W^T = (H^*H + \sigma^2 I)^{-1} H^*$,
H is a matrix with m' × n' in dimension. It is the estimated UL channel for the n' spatial streams scheduled by AP1 in the UL short transmission in the description 1, received by the m' antennas at the APi (i >= 1) for a particular RU assuming unit transmit power per spatial stream.
* is a conjugate transpose operator and T is transpose operator.
$\sigma^2$ is the estimated noise power per receive antenna at APi.
$M^{-1}$ represents the inverse of the matrix M, I is an identity matrix.
A1 from AP1 (or Bi from APi for i > 1) is the combination of the channel estimation signal that is precoded with each column of W and then possibly with a different cyclic shift delay per column.
B1 from AP1 (or Ai from APi) is the combination of the channel estimation signal that is precoded with precoding vectors spanning the subspace orthogonal to the subspace spanned by the column vectors of W.

TABLE 2

Precoding Vector - Method B

Method B:
For each tone and symbol per RU in the short UL transmission in description 1, construct a m' × 1 column vector x with each element representing the received signal at one of the m' antennas at APi.
Compute a covariance matrix $M = E[xx^*] = V\Sigma^2 V^*$.
M is a m' × m' matrix.
$V\Sigma^2 V^*$ represents an eigenvalue decomposition.
E[ ] represents expected value.
$\Sigma$ is a diagonal matrix and V is an orthogonal matrix.
$V_0^*$ is the matrix consisting of rows of $V^*$ corresponding to small eigenvalues.
B1 from AP1 (or Ai from APi for i > 1) is the combination of channel estimation signal that is precoded with each column of $V_0^{*T}$, and then possibly with a different cyclic shift delay per column.
A1 from AP1 (or Bi from APi) is the combination of the channel estimation signal with another index that is precoded with precoding vectors spanning the subspace orthogonal to the subspace spanned by the column vectors of $V_0^{*T}$.

What is claimed is:

1. An apparatus for wireless communication in a network, the apparatus comprising:
   (a) a wireless communication circuit, as a station, wirelessly communicating with other stations on a wireless local area network (WLAN) in an IEEE 802.11 protocol configured for supporting orthogonal frequency-division multiple access (OFDMA), and uplink OFDMA random access (UORA) over a carrier-sense multiple-access/collision avoidance (CSMA/CA) mechanism;
   (b) a processor of said station;
   (c) a non-transitory memory storing instructions executable by the processor for communicating spatial streams with other stations and fulfilling different roles of a communications protocol, in which said station may operate as an access point (AP) which is either a primary AP or a secondary AP, or may operate as a non-access point station (STA); and
   (d) wherein said instructions, when executed by the processor, perform one or more steps comprising:
      (i) transmitting a first trigger frame (TF) by said station operating as a primary access point (AP) to schedule a short uplink (UL) transmission from another station, to allow the primary AP and one or more secondary APs to estimate spatial filtering to be utilized in the favorable and unfavorable directions of each of the APs;
      (ii) jointly transmitting a joint physical layer protocol data unit (PPDU) containing one or more second trigger frames, by the primary AP and one or more secondary APs with channel estimation signals precoded by weights of the spatial filtering;
      (iii) utilizing the channel estimation signals allows UORA non-AP stations wanting to access secondary APs whether they are in a favored direction or an unfavored direction to each primary and secondary AP and criteria provided to the UORA non-AP stations to determine if they are eligible for UORA access; and
      (iv) whereby a sum of the number of spatial streams of scheduled UL transmissions by the primary AP and a number of UORA stations using the same time and frequency resource are allowed to exceed a number of receive antennas available in the primary AP.

2. The apparatus of claim 1, wherein each AP, primary AP or secondary APs, partitions its antenna precoding to two subspaces, one for the favored directions and one for the unfavored directions.

3. The apparatus of claim 1, wherein said first TF contains a joint PPDU subfield with information on the channel estimation signals for a subsequent joint PPDU.

4. The apparatus of claim 1, wherein said first TF comprises a buffer status report poll (BSRP) frame.

5. The apparatus of claim 1, wherein said first TF is sent by said primary AP and can trigger multiple spatial streams.

6. The apparatus of claim 1, wherein in response to one of the second TFs for determining eligibility for a UORA access by a non-AP station, the OFDMA count window (OCW) counter is updated and if a terminal count is reached and UORA is performed on one of the eligible RUs.

7. An apparatus for wireless communication in a network, the apparatus comprising:
   (a) a wireless communication circuit, as a station, wirelessly communicating with other stations on a wireless local area network (WLAN) in an IEEE 802.11 protocol configured for supporting orthogonal frequency-division multiple access (OFDMA), and uplink OFDMA random access (UORA);
   (b) wherein each AP, primary AP or secondary APs, partitions its antenna precoding to two subspaces, one for the favored directions and one for the unfavored directions;
   (c) a processor of said station;
   (d) a non-transitory memory storing instructions executable by the processor for communicating spatial streams with other stations and fulfilling different roles of a communications protocol, in which said station may operate as an access point (AP) which is either a primary AP or a secondary AP, or may operate as a non-access point station (STA); and
   (e) wherein said instructions, when executed by the processor, perform one or more steps comprising:
      (i) transmitting a first trigger frame (TF) by said station operating as a primary access point (AP) to schedule a short uplink (UL) transmission from another station, to allow the primary AP and one or more secondary APs to estimate spatial filtering to be utilized in the favorable and unfavorable directions of each of the APs;
      (ii) wherein said first TF contains a joint PPDU subfield with information on the channel estimation signals for a subsequent joint PPDU; wherein said first TF can trigger multiple spatial streams;
      (iii) jointly transmitting a joint physical layer protocol data unit (PPDU) containing one or more second trigger frames, by the primary AP and one or more secondary APs with channel estimation signals precoded by weights of the spatial filtering;
      (iv) utilizing the channel estimation signals allows UORA non-AP stations wanting to access secondary APs whether they are in a favored direction or an unfavored direction to each primary and secondary AP and criteria provided to the UORA non-AP stations to determine if they are eligible for UORA access; and
      (v) whereby a sum of the number of spatial streams of scheduled UL transmissions by the primary AP and a number of UORA stations using the same time and frequency resource are allowed to exceed a number of receive antennas available in the primary AP.

8. The apparatus of claim 7, wherein said first TF comprises a buffer status report poll (BSRP) frame.

9. The apparatus of claim 7, wherein in response to one of the second TFs for determining eligibility for a UORA access by a non-AP station, the OFDMA count window (OCW) counter is updated and if a terminal count is reached and UORA is performed on one of the eligible RUs.

10. A method of performing wireless communications in a network, comprising:
   (a) performing wireless communications between stations of a wireless local area network (WLAN) in an IEEE 802.11 protocol configured for supporting orthogonal frequency-division multiple access (OFDMA), and uplink OFDMA random access (UORA) over a carrier-sense multiple-access/collision avoidance (CSMA/CA) mechanism;
   (b) transmitting a first trigger frame (TF) by a primary access point (AP) to schedule a short uplink (UL) transmission from another station, to allow the primary AP and one or more secondary APs to estimate spatial filtering to be utilized in the favorable and unfavorable directions of each of the APs;
   (c) jointly transmitting a joint physical layer protocol data unit (PPDU) containing one or more second TFs, by the primary AP and one or more secondary APs, with channel estimation signals precoded by weights of the spatial filtering;
   (d) utilizing the channel estimation signals to allow UORA non-AP stations, wanting to access secondary APs, whether they are in a favored direction or an unfavored direction to each primary and secondary AP and criteria provided to the UORA non-AP stations to determine if they are eligible for UORA access; and
   (e) whereby a sum of the number of spatial streams of scheduled UL transmissions by the primary AP and a number of UORA stations using the same time and frequency resource are allowed to exceed a number of receive antennas available in the primary AP.

11. The method of claim 10, wherein each AP, primary AP or secondary APs, partitions its antenna precoding to two subspaces, one for the favored directions and one for the unfavored directions.

12. The method of claim 10, wherein said first TF contains a joint PPDU subfield with information on the channel estimation signals for a subsequent joint PPDU.

13. The method of claim 10, wherein said first TF comprises a buffer status report poll (BSRP) frame.

14. The method of claim 10, wherein said first TF is sent by said primary AP and can trigger multiple spatial streams.

15. The method of claim 10, wherein in response to one of the second TFs for determining eligibility for a UORA access by a non-AP station, the OFDMA count window (OCW) counter is updated and if a terminal count is reached and UORA is performed on one of the eligible RUs.

* * * * *